United States Patent [19]

Schubert et al.

[11] 4,121,473

[45] Oct. 24, 1978

[54] SIMULTANEOUSLY CONTROLLED POSTAGE METER CONVERSION APPARATUS

[75] Inventors: Keith E. Schubert, Rowayton; Philip Pollak, Jr., Westport, both of Conn.

[73] Assignee: Pitney-Bowes, Inc., Stamford, Conn.

[21] Appl. No.: 705,477

[22] Filed: Jul. 15, 1976

[51] Int. Cl.[2] .......................... F16H 27/02; B65C 11/00

[52] U.S. Cl. .......................................... 74/89.15; 221/2; 226/134

[58] Field of Search .................... 74/89.15, 89.2; 53/61

[56] References Cited

U.S. PATENT DOCUMENTS

| | | | |
|---|---|---|---|
| 2,726,812 | 12/1955 | Uhl | 235/101 |
| 3,640,140 | 2/1972 | Gulick et al. | 74/89.15 |
| 3,727,366 | 4/1973 | Schlueter et al. | 53/61 |
| 3,797,324 | 3/1974 | Sheesley et al. | 74/89.15 |
| 3,877,677 | 4/1975 | Daghe et al. | 74/89.15 |
| 3,937,295 | 2/1976 | Wright | 74/89.15 |

*Primary Examiner*—Allan D. Herrmann
*Assistant Examiner*—Wesley S. Ratliff, Jr.
*Attorney, Agent, or Firm*—Peter Vrahotes; William D. Soltow, Jr.; Albert W. Scribner

[57] ABSTRACT

A postage meter conversion apparatus is disclosed that will convert a mechanical, lever operated postage meter into an electrically controlled postage meter. The conversion apparatus is easily assembled to and disassembled from a standard lever operated postage meter. Each lever of the meter is operated simultaneously. The conversion apparatus is so constructed that all the levers of the meter can be actuated at once. Optical monitors are provided to control the operation of the conversion unit so that the setting of the postage amount may be achieved. The conversion apparatus can be used to make the mechanical meter compatible in an electrical environment containing equipment such as a computer, a digital scale, and other postage system processing devices.

6 Claims, 3 Drawing Figures

SIMULTANEOUSLY CONTROLLED POSTAGE METER CONVERSION APPARATUS

This invention pertains to postal equipment, and more particularly to a conversion unit for making a standard mechanical postage meter compatible in an electrical environment.

BACKGROUND OF THE INVENTION

With more and more processing equipment becoming electrically controlled, a need is emerging for converting mechanical postal systems and equipment to electrical control.

Because present federal law prevents the direct electrical redesign of a postage meter, the invention concerns itself with the logical alternative, viz., a conversion attachment.

While conversion attachments are not new per se, the present invention features a novel mechanism packaged as a unit which provides ease of adaptability, assembly, reliability and low cost of manufacture.

RELATED APPLICATION

A postage meter conversion unit not unlike the present invention is illustrated in patent application Ser. No. 669,529; filed Mar. 23, 1976. This prior apparatus set each lever of the postage meter in a sequential manner. The present inventive unit sets each postage meter bank simultaneously with the outer meter banks in order to provide a quicker meter setting capability.

SUMMARY OF THE INVENTION

The invention relates to a postage meter conversion apparatus for converting a lever operated mechanical postage meter to an electrically controlled postage meter.

The inventive conversion unit comprises a drive motor for each meter bank. A number of screw-type feed apparatuses are each rotatively driven by a respective motor. As each screw of the feed apparatuses is rotated, a respective follower member is caused to move laterally across the screw. A lever of each postage meter bank is respectively connected to a follower member such that, as the follower member is caused to move, the lever is set to a desired postage value.

The motors are generally operated simultaneously to provide a quick setting of postage. Appropriate electronics may be designed into the system such that each bank need not be zeroed. In other words, each bank may be set directly from a previous position or setting.

A movable band (belt) is attached to each follower to provide for monitoring of the lever positions. The band contains markings or apertures that are optically counted. The markings are unevenly spaced along the band to compensate for the arcuate movement of the lever, vis-a-vis the linear movement of the follower member.

A limiting means prevents the screws from overriding.

The inventive mechanism allows for a compact unit.

The conversion unit is easily assembled to the postage meter and its surrounding housing. The conversion apparatus allows the mechanical meter to be electrically controlled by a computer or a digital scale, etc.

It is an object of this invention to provide an improved conversion apparatus for operating a mechanical postage meter by electrical control;

It is another object of the invention to provide a conversion unit for a postage meter which is easy to assemble;

It is a further object of this invention to provide a reliable low cost conversion unit for electrically controlling a standard mechanical postage meter.

These and other objects of the invention will become more apparent and will be better understood with reference to the following detailed description taken in conjunction with the attached drawings, in which.

DETAILED DESCRIPTION

Figure 1:
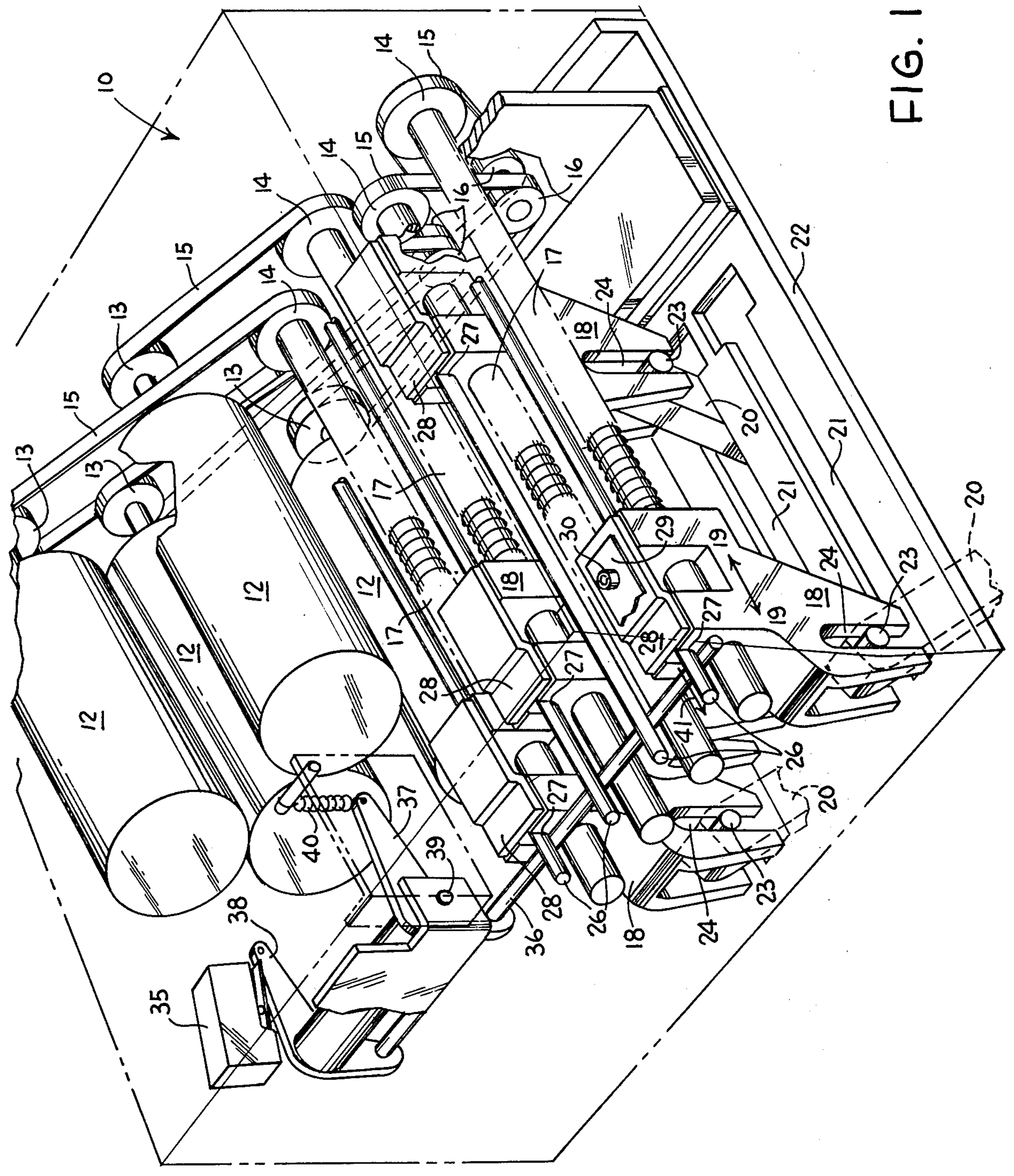
FIG. 1 is a perspective view of the conversion apparatus of the invention.
Figure 4:
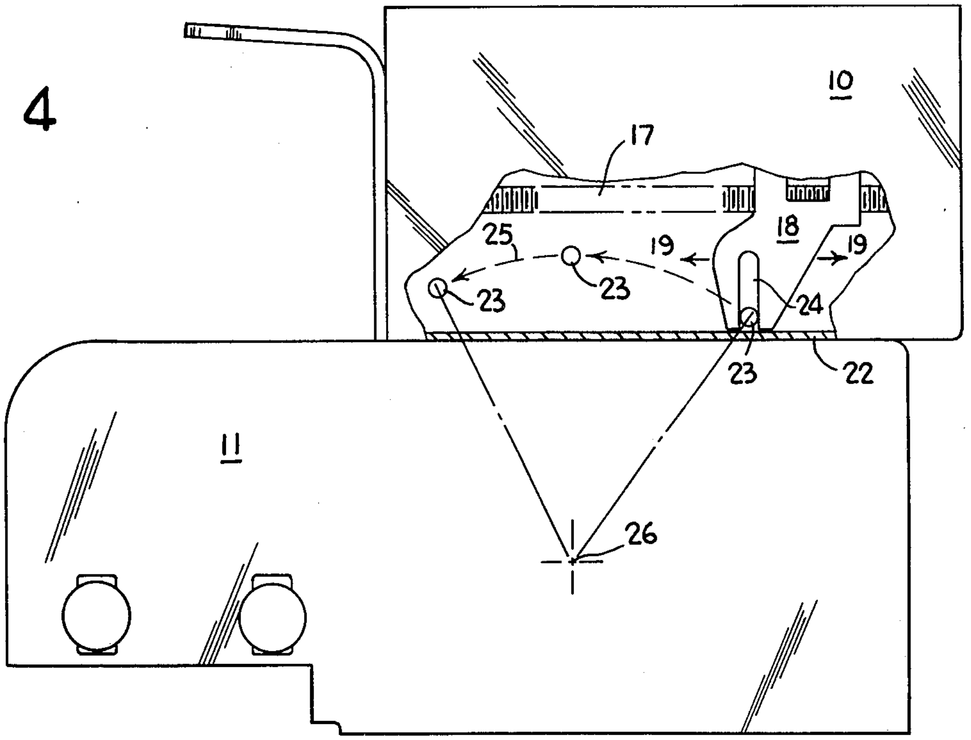
FIG. 4 is a side in situ view of the conversion apparatus of FIG. 1, mounted upon a postage meter.

Now referring to FIGS. 1 and 4, a conversion unit 10 of this invention is shown in mounting relationship to a lever-operated postage meter 11 (FIG. 4). The postage meter 11 can be a model 5300, manufactured by the present assignee of the invention, Pitney Bowes Corporation, Stamford, Connecticut. The conversion unit 10 comprises a number of driving motors 12 (FIG. 1) that rotatively drive pulleys 13, respectively. There is one motor 12 for each meter bank. In the embodiment shown, there are four meter banks and, therefore, four motors. Any number of motors or banks can be used consistent with the teachings of this invention.

When the pulleys 13 are caused to rotate, they in turn drive pulleys 14 via belts 15. Belts 15 may be timing belts or ordinary transmission belts. Belts 15 may wrap around intermediate pulleys 16 as shown, in order to provide a compactness for the overall pulley system.

Each of the pulleys 14 are affixed to screw shafts 17, and cause these shafts to turn when they rotate. The driving motors 12 are reversible, so that each screw shaft 17 may rotate either in a clockwise or counterclockwise direction.

Each shaft 17 rotatively supports a threaded, yoke-type, follower 18, that moves laterally (arrows 19) when the screw shaft 17 is caused to turn.

A lever 20 of each respective postage meter bank projects through a slot 21 in the base plate 22 of the conversion unit 10. The levers 20 are prepared to receive a pin 23. Each of the yokes 18 are bifurcated to receive levers 20. A pin 23 is affixed to each lever, and is adapted to slide within the vertical slots 24 of the yoke member 18.

Each of the levers 20, and hence the affixed pins 23, will move along an arcuate path 25 as depicted in FIG. 4. That is so, because the levers 20 pivot about point 26 inside the meter 11.

When the yoke followers 18 are caused to move laterally (arrows 19), the levers 20 are forced via pin 23 to move along the arcuate path 25 to a postage value setting postion. There are ten evenly spaced value positions (0 through 9) along the arcuate path, for each bank. Each of the positions are detented within the meter.

Because of the arcuate travel of the levers 20 and pins 23, the lateral movement (distance) of the yokes 18 will be different between individual value positions along the arcuate path 25. In addition, slots 24 must be properly elongated to allow for the maximum and minimum vertical positions of the pins 23 along the arcuate path 25.

A fixed guide rod 26 (FIGS. 1 and 3) extends through a slot 27 in an upper portion of each yoke 18. The guide rods 26 prevent each of the yoke followers 18 from cocking or rotating as they are rotatively fed by the screw shafts 17. The yokes 18 will slide along the respective guide rods 26 and they move laterally (arrows 19).

Figure 3:
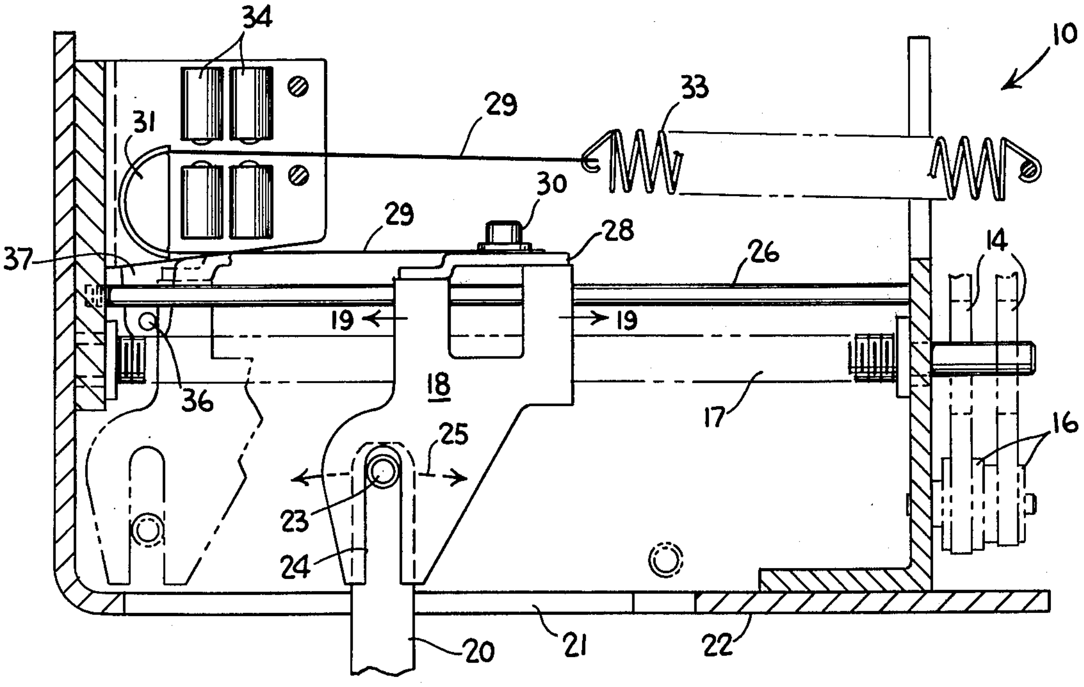
FIG. 3 is a side view of the postage meter conversion unit depicted in FIG. 1.

A cover plate 28 is affixed to the tops of each respective yoke member 18 as illustrated in FIGS. 1 and 3.

Figure 2:
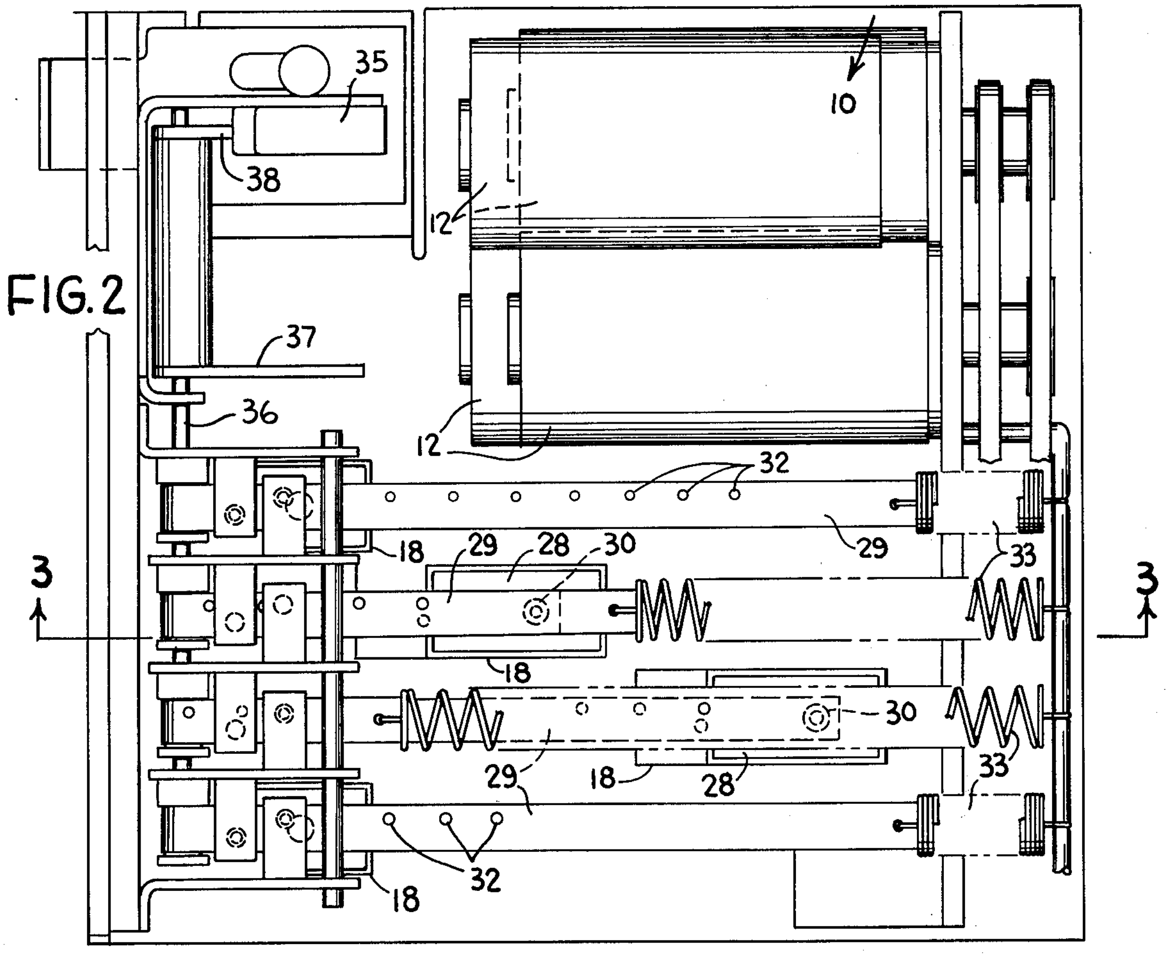
FIG. 2 is a top view of the inventive conversion apparaus shown in FIG. 1.
Figure 5:
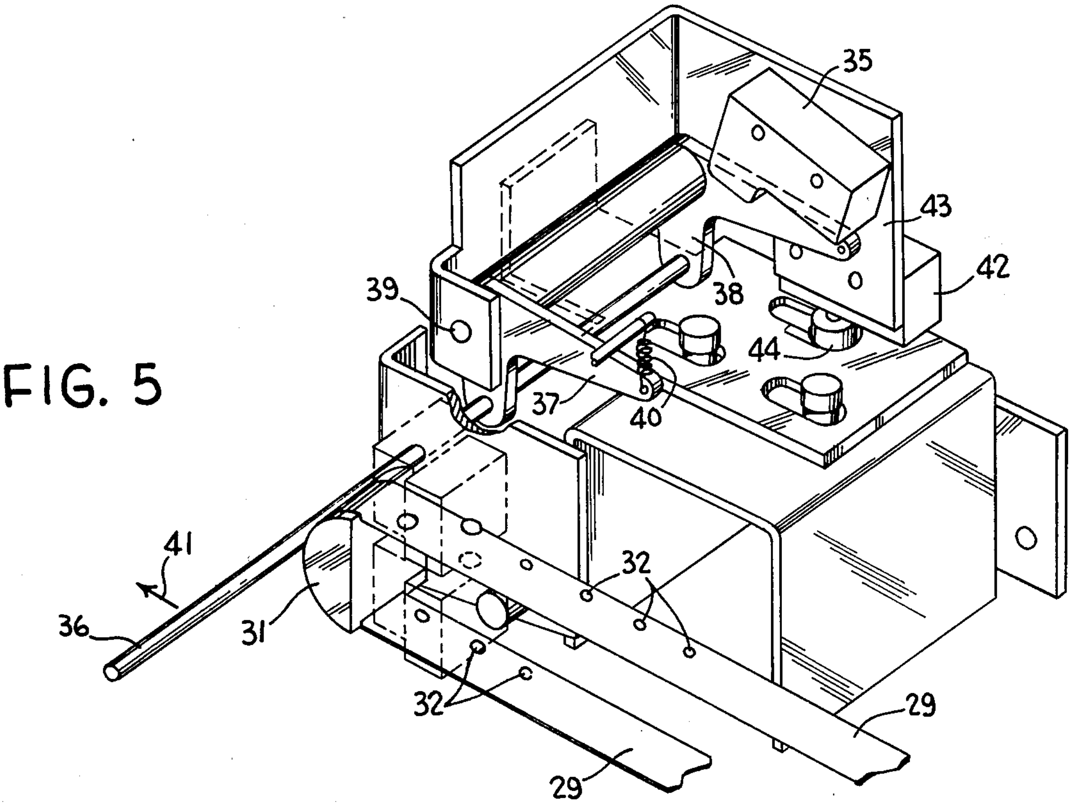
FIG. 5 is a perspective view of an override device for the conversion unit illustrated in FIG. 1.

A movable belt (band) 29 is secured to each cover plate 28 via a nut 30 (FIGS. 1–3). The belts 29 slidably wrap around a semi-circular, (capstan) guide member 31 as depicted in FIGS. 3 and 5. These belts 29 are used for monitoring the travel of yoke members 18, and hence, assure the attainment of proper value positions of lever 20. The belts 29 have markings 32 (apertures) disposed thereon as shown in FIGS. 2 and 5. The belts 29 are each attached at their far end to a spring 33 (FIGS. 2 and 3), which tensions the belt around guide 31. As the yoke 18 moves laterally, the belt 29 is also caused to move. The markings 32 on the belt 29 are caused to move past a detection device comprising a pair of photodetectors 34 (FIG. 3). These photodetectors 34 will monitor the travel of the respective belts 29 via the markings 32, and hence, the lever positions, as aforementioned.

The markings 32 on the respective belts 29 are unevenly spaced from each other as previously mentioned, to accommodate the conversion from the arcuate travel of levers 20 to the linear travel of yokes 18 and belts 29.

One of the pair of photodetectors 34 is used to monitor a zero or home position in cooperation with a single marking (not shown) in the row of ten holes designating the 0, 1, 2, 3, 4, 5, 6, 7, 8, 9 positions. In addition, one or the other of the detectors can be used to detect any over-travel for yoke members 18.

A limit switch 35 (FIGS. 1, 2 and 5) detects the over-travel of any one of the yoke members 18. When a yoke member 18 over-runs its last position, it will push (arrow 41) against rod 36. The rod 36, which is connected to bell cranks 37 and 38, will cause these bell cranks to pivot about the pivot shaft 39. The bell crank 38, will close switch 35, which will provide a signal of the over-ride condition. Switch 35 can be connected to the electrical motors 12, to shut them down and prevent a stall condition. The over-ride signal may also be used to activate the motors 12 to return the yokes 18 to zero.

Bell crank 37 is connected to a tensioning spring 40, that acts to bias the rod 36 against closing switch 35 via bell crank 38.

A switch 42 (FIG. 5) secured to the conversion unit housing 43 is caused to be closed by an abutment 44 attached to the mounting structure for the conversion unit. The switch 42 will only be closed, when the conversion unit 10 is properly mounted on postage meter 11. The switch 42 will not allow the conversion unit 10 to operate unless properly mounted.

Many modifications will naturally occur to the skilled practitioner. All such changes which are obvious or otherwise fall within the limits of the appended claims, are deemed to lie within the spirit and scope of this invention.

What is claimed is:

1. An actuator mechanism adapted to set a postage meter having a plurality of setting levers, each of said postage meter setting levers being movable to a selected one of a plurality of postage value positions: comprising a frame;

a plurality of lead screws rotatably mounted on said frame;

a plurality of follower members respectively carried by said lead screws, each follower member being adapted to be displaced in response to rotation of its associated lead screw and being adapted to be connected to an associated one of said levers;

a plurality of electric motors mounted on said frame, said motors being respectively connected so as to rotatably drive an associated one of said lead screws;

means for mounting said actuator mechanism on said postage meter; and means for assuring the positionment of each setting lever in each of its said value positions.

2. Apparatus as defined by claim 1, additionally comprising interlocking means for enabling said actuator mechanism to set said levers when said mechanism is properly mounted on said postage meter and for disabling said actuator mechanism when the latter is improperly mounted on said postage meter.

3. An actuator mechanism adapted to set a postage meter having a plurality of setting levers, each of said postage meter setting levers being movable to a selected one of a plurality of postage value positions: comprising a frame;

a plurality of lead screws rotatably mounted on said frame;

a plurality of follower members respectively carried by said lead screws, each follower member being adapted to be displaced in response to rotation of the associated lead screw and being adapted to be connected to an associated one of said setting levers;

a plurality of electric drive motors mounted on said frame, each of said motors being connected so as to rotatably drive an associated one of said lead screws; and interlocking means for enabling said actuator mechanism to set said levers when said mechanism is properly mounted on said postage meter and for disabling said actuator mechanism when said mechanism is improperly mounted on said postage meter.

4. Apparatus as defined by claim 3 additionally comprising means for sensing positionment of each setting lever in each of its said value positions.

5. An actuator mechanism adapted to set a postage meter having a plurality of setting levers, each of said postage meter setting levers being movable to a selected one of a plurality of postage value positions: comprising a frame;

a plurality of lead screws rotatably mounted on said frame;

a plurality of follower members respectively carried by said lead screws, each follower member being adapted to be displaced in response to rotation of the associated lead screw and being adapted to be connected to an associated one of said setting levers;

a plurality of an electric drive motor mounted on said frame, each motor being connected so as to rotatably drive an associated one of said lead screws; and means for sensing positionment of each of said setting levers in each of its said value positions.

6. Apparatus as defined by claim 5, additionally comprising interlocking means for enabling said actuator mechanism to set said levers when said mechanism is properly mounted on said postage meter and for disabling said actuator mechanism when the latter is improperly mounted on said postage meter.

* * * * *